(12) United States Patent
Wang et al.

(10) Patent No.: US 12,487,931 B2
(45) Date of Patent: *Dec. 2, 2025

(54) UNIFORM CACHE SYSTEM FOR FAST DATA ACCESS

(71) Applicant: Advanced Micro Devices, Inc., Santa Clara, CA (US)

(72) Inventors: Dazheng Wang, Shanghai (CN); Xuwei Chen, Shanghai (CN)

(73) Assignee: ADVANCED MICRO DEVICES, INC., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/656,513

(22) Filed: May 6, 2024

(65) Prior Publication Data

US 2024/0289276 A1  Aug. 29, 2024

Related U.S. Application Data

(63) Continuation of application No. 17/125,971, filed on Dec. 17, 2020, now Pat. No. 12,001,334.

(30) Foreign Application Priority Data

Dec. 11, 2020 (CN) .......................... 202011448847.8

(51) Int. Cl.
*G06F 12/08* (2016.01)
*G06F 12/0811* (2016.01)
*G06F 12/0831* (2016.01)
*G06F 12/0891* (2016.01)

(52) U.S. Cl.
CPC ...... *G06F 12/0811* (2013.01); *G06F 12/0833* (2013.01); *G06F 12/0891* (2013.01); *G06F 2212/1021* (2013.01)

(58) Field of Classification Search
CPC ............. G06F 12/0811; G06F 12/0833; G06F 12/0891; G06F 2212/1021
See application file for complete search history.

(56) References Cited

U.S. PATENT DOCUMENTS

| | | | |
|---|---|---|---|
| 9,189,414 B1 | 11/2015 | Shim et al. | |
| 2017/0357587 A1* | 12/2017 | Jones, III | ............ G06F 12/0842 |
| 2019/0179752 A1* | 6/2019 | Yoo | ..................... G06F 12/0891 |
| 2019/0294546 A1 | 9/2019 | Agarwal | |
| 2020/0174928 A1 | 6/2020 | Ko | |
| 2020/0409867 A1 | 12/2020 | Colglazier | |

* cited by examiner

*Primary Examiner* — Masud K Khan
(74) *Attorney, Agent, or Firm* — VOLPE KOENIG

(57) ABSTRACT

A uniform cache for fast data access including a plurality of compute units (CUs) and a plurality of L0 caches with an arrangement in a network configuration where each one of CUs is surrounded by a first group of the plurality of L0 caches and each of the plurality of L0 caches is surrounded by a L0 cache group and CU group. One of CUs, upon a request for data, queries the surrounding first group of L0 caches to satisfy the request. If the first group of L0 caches fails to satisfy the data request, the first group of the plurality of L0 caches queries a second group of adjacent L0 caches to satisfy the request. If the second group of adjacent L0 caches fails to satisfy the data request, the second group of adjacent L0 caches propagating the query to the next group of L0 caches.

20 Claims, 8 Drawing Sheets

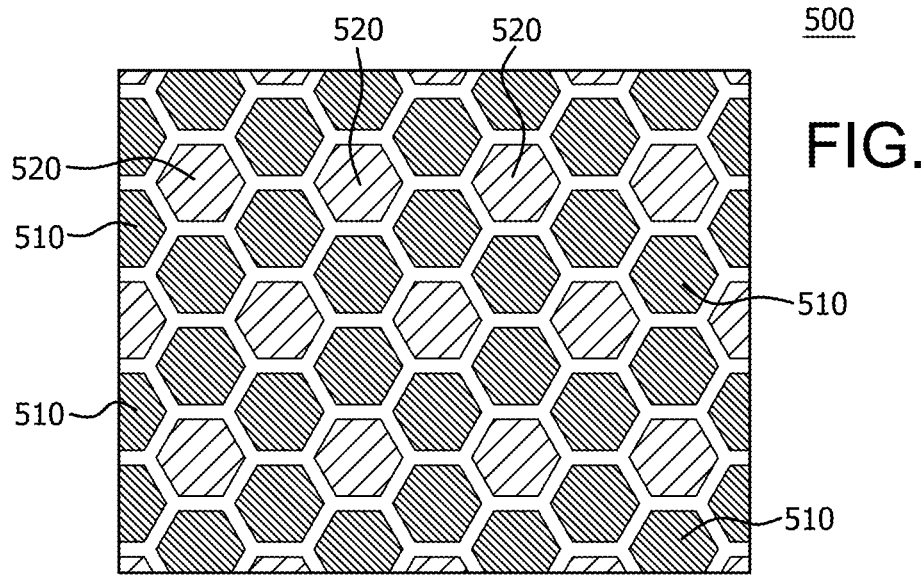
FIG. 5A
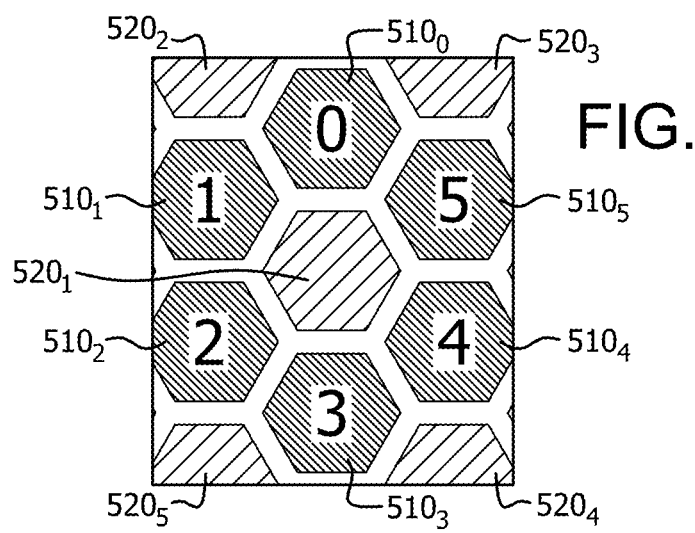
FIG. 5B
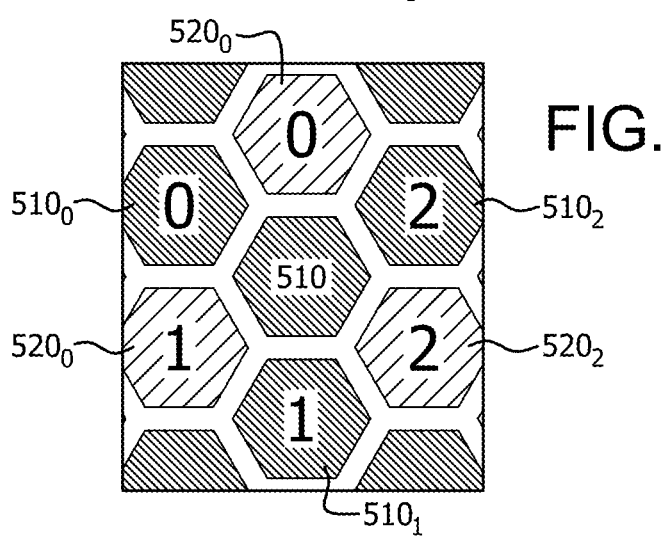
FIG. 5C
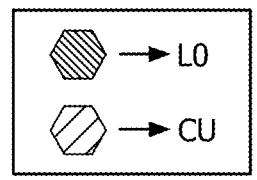

UNIFORM CACHE SYSTEM FOR FAST DATA ACCESS

CROSS REFERENCE TO RELATED APPLICATION

This application is a continuation of U.S. application Ser. No. 17/125,971, filed Dec. 17, 2020, which claims priority to Chinese Patent Application No. 202011448847.8, filed Dec. 11, 2020, the entire contents of which is hereby incorporated by reference as if fully set forth herein.

BACKGROUND

A central processing unit (CPU) cache is a hardware cache used by the CPU of a computer to reduce the average time or energy, collectively referred to as cost, to access data from the main memory. Generally, a cache is a smaller, faster memory, located closer to a processor core, which stores copies of the data from frequently used main memory locations. Most CPUs have a hierarchy of multiple cache levels (L1, L2, L3, L4, etc.), with separate instruction-specific and data-specific caches at level 1.

Hardware implements cache as a block of memory for temporary storage of data likely to be used again. CPUs and hard disk drives (HDDs) frequently use a cache, as do web browsers and web servers.

A cache is made up of a pool of entries. Each entry has associated data, which is a copy of the same data stored elsewhere in the system, referred to as in some backing store. Each entry also has a tag, which specifies the identity of the data in the backing store of which the entry is a copy. Tagging allows simultaneous cache-oriented algorithms to function in multilayered fashion without differential relay interference.

When the cache client (a CPU, a GPU, web browser, operating system) needs to access data presumed to exist in the backing store, the cache client first checks the cache. If an entry in the cache can be found with a tag matching that of the desired data, the data in the entry is used instead. This situation is known as a cache hit. For example, a web browser program might check its local cache on disk to see if it has a local copy of the contents of a web page at a particular URL. In this example, the URL is the tag, and the content of the web page is the data.

The alternative situation, when the cache is checked and found not to contain any entry with the desired tag, is known as a cache miss. This requires a more expensive access of data from the backing store. Once the requested data is retrieved, it is typically copied into the cache, ready for the next access. During a cache miss, some other previously existing cache entry is removed in order to make room for the newly retrieved data.

BRIEF DESCRIPTION OF THE DRAWINGS

A more detailed understanding can be had from the following description, given by way of example in conjunction with the accompanying drawings wherein:

FIG. 5A illustrates a cache configuration;

FIG. 5B illustrates an expanded view of a portion of the cache configuration of FIG. 5A;

FIG. 5C illustrates an expanded view of a portion of the cache configuration of FIG. 5A;

DETAILED DESCRIPTION

Figure 1:
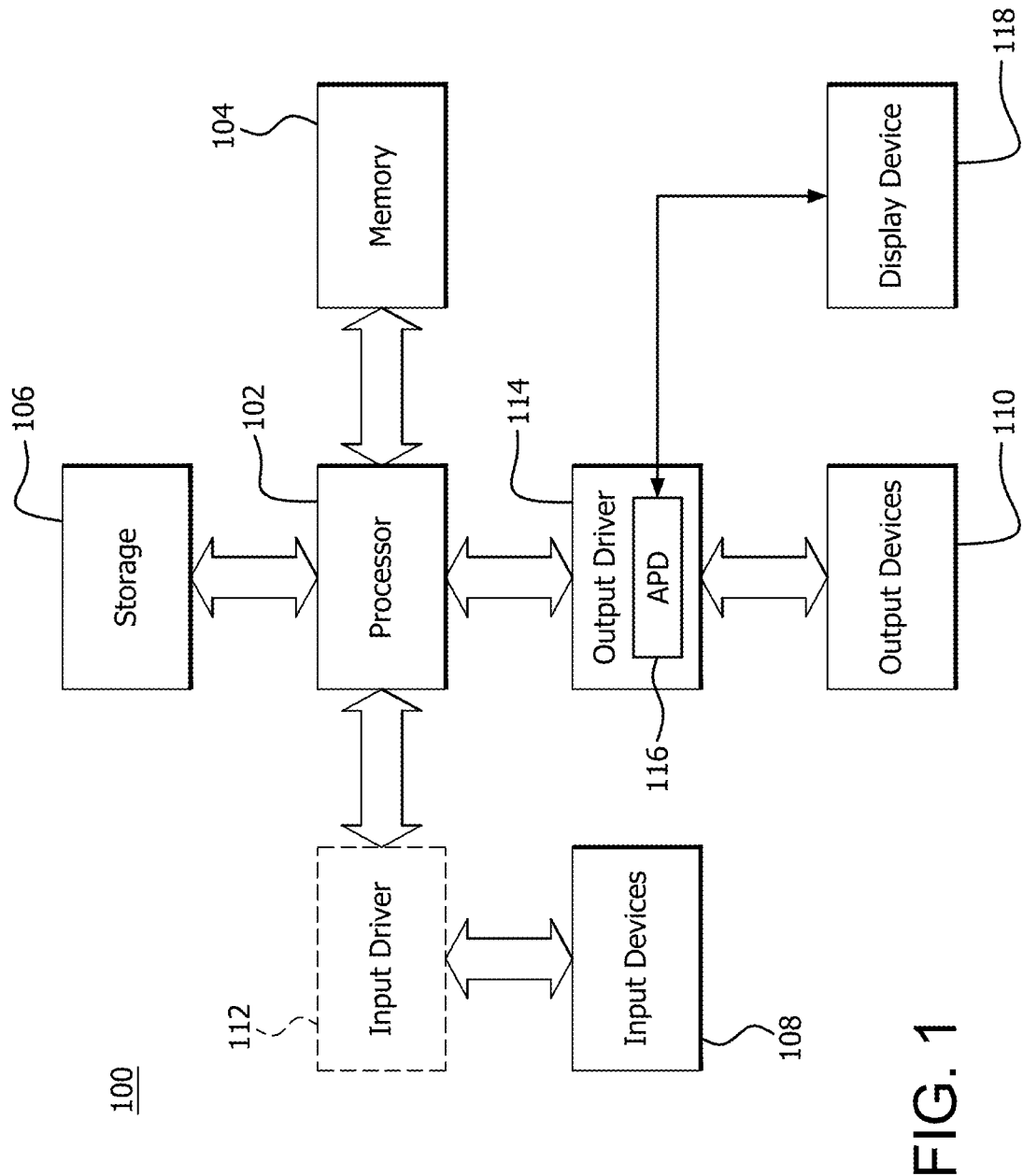
FIG. 1 is a block diagram of an example device in which one or more features of the disclosure can be implemented.

Current cache configurations include a cache system and method where the L0 caches are standalone. The L0 caches are directly connected to the next portion of the hierarchy in a mesh of tree (MoT) configuration. Such current cache configurations provide for more levels in the hierarchy magnifying a longer latency involved at each level. Further, in current cache systems, since the L0 caches are not connected together, these L0 caches cannot share data.

The present system and method provide a uniform cache system that reduces the connection complexity using a network, such cell network. This cache system is composed of intelligent L0 caches (also referred to as cells). The L0 caches may actively search the address when there is a missed transaction sent from CU. The present cache system and method provide a searching latency that is proportional to the network's radius. This radius may be only a few cycles and therefore the present uniform cache system provides much needed improvement over the existing thousands of cycles of routing and arbitration in current cache systems.

A uniform cache system for fast data access is disclosed. The system includes a plurality of compute units (CUs) and a plurality of L0 caches. The plurality of CUs and the plurality of L0 caches are arranged in a network configuration where each one of the plurality of CUs is surrounded by a first group of the plurality of L0 caches and each of the plurality of L0 caches is surrounded by a L0 cache group and CU group. Operationally, ones of the plurality of CUs, upon a request for data, queries the surrounding first group of the plurality of L0 caches to satisfy the request. The system may include a first group with six L0 caches. The system may include a L0 cache group with three L0 caches. The system may include a CU group with three CUs. On a condition that the first group of the plurality of L0 caches fails to satisfy the data request, each of the first group of the plurality of L0 caches query a second group of adjacent L0 caches to satisfy the request. On a condition that the second group of adjacent L0 caches fails to satisfy the data request, each of the second group of adjacent L0 caches propagates the query to the next group of L0 caches. The system may iterate subsequent propagations of the query to subsequent next groups of L0 caches. This propagation may occur until the border of the network is reached. Once the border of the network is reached, the request may be passed to the L2 cache.

A method performed in a uniform cache system for fast data access is disclosed. The method includes receiving a data request at at least one compute unit (CU) and sending data request from the at least one CU to an adjacent first group of L0 caches to satisfy the request. On a condition that the first group of the plurality of L0 caches fails to satisfy the data request, the method includes propagating the data request from the first group of L0 caches to next tier of L0 caches to satisfy the request. On a condition that the next tier of L0 caches fails to satisfy the data request, the method includes iteratively propagating the data request to subsequent tiers of L0 caches. The method includes iterating subsequent propagations of the data request to subsequent next groups of L0 caches. The method includes, on a condition of a hit, returning the data requested, and killing the data request. The method includes, on a condition of a miss when the request reaches to the border L0 caches, providing the data request to an L2 cache.

A non-transient computer readable medium including hardware design code stored thereon which when executed by a processor cause the system to perform a method for fast data access in a uniform cache system is disclosed. The method includes receiving a data request at at least one compute unit (CU) and sending data request from the at least one CU to an adjacent first group of L0 caches to satisfy the request. On a condition that the first group of the plurality of L0 caches fails to satisfy the data request, the method includes propagating the data request from the first group of L0 caches to next tier of L0 caches to satisfy the request. On a condition that the next tier of L0 caches fails to satisfy the data request, the method includes iteratively propagating the data request to subsequent tiers of L0 caches. The method includes iterating subsequent propagations of the data request to subsequent next groups of L0 caches. The method includes, on a condition of a hit, returning the data requested, and killing the data request. The method includes, on a condition of a miss when the request reaches to the border L0 caches, providing the data request to an L2 cache.

FIG. 1 is a block diagram of an example device 100 in which one or more features of the disclosure can be implemented. The device 100 can include, for example, a computer, a gaming device, a handheld device, a set-top box, a television, a mobile phone, or a tablet computer. The device 100 includes a processor 102, a memory 104, a storage 106, one or more input devices 108, and one or more output devices 110. The device 100 can also optionally include an input driver 112 and an output driver 114. It is understood that the device 100 can include additional components not shown in FIG. 1.

In various alternatives, the processor 102 includes a central processing unit (CPU), a graphics processing unit (GPU), a CPU and GPU located on the same die, or one or more processor cores, wherein each processor core can be a CPU or a GPU. In various alternatives, the memory 104 is located on the same die as the processor 102, or is located separately from the processor 102. The memory 104 includes a volatile or non-volatile memory, for example, random access memory (RAM), dynamic RAM, or a cache.

The storage 106 includes a fixed or removable storage, for example, a hard disk drive, a solid-state drive, an optical disk, or a flash drive. The input devices 108 include, without limitation, a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 include, without limitation, a display, a speaker, a printer, a haptic feedback device, one or more lights, an antenna, or a network connection (e.g., a wireless local area network card for transmission and/or reception of wireless IEEE 802 signals).

The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. It is noted that the input driver 112 and the output driver 114 are optional components, and that the device 100 will operate in the same manner if the input driver 112 and the output driver 114 are not present. The output driver 114 includes an accelerated processing device ("APD") 116 which is coupled to a display device 118. The APD accepts compute commands and graphics rendering commands from processor 102, processes those compute and graphics rendering commands, and provides pixel output to display device 118 for display. As described in further detail below, the APD 116 includes one or more parallel processing units to perform computations in accordance with a single-instruction-multiple-data ("SIMD") paradigm. Thus, although various functionality is described herein as being performed by or in conjunction with the APD 116, in various alternatives, the functionality described as being performed by the APD 116 is additionally or alternatively performed by other computing devices having similar capabilities that are not driven by a host processor (e.g., processor 102) and provides graphical output to a display device 118. For example, it is contemplated that any processing system that performs processing tasks in accordance with a SIMD paradigm may perform the functionality described herein. Alternatively, it is contemplated that computing systems that do not perform processing tasks in accordance with a SIMD paradigm performs the functionality described herein.

Figure 2:
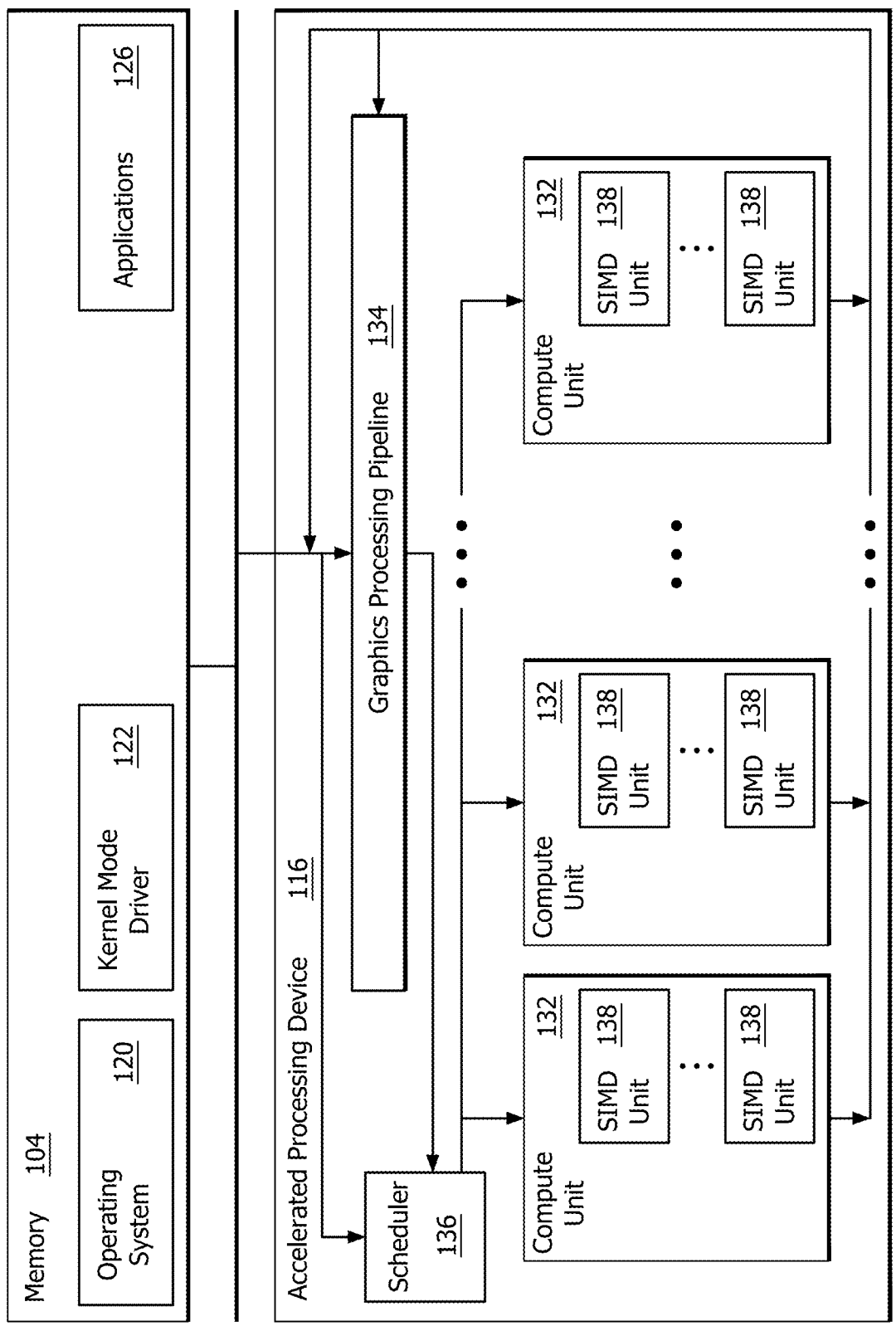
FIG. 2 is a block diagram of the device of FIG. 1, illustrating additional detail.

FIG. 2 is a block diagram of the device 100, illustrating additional details related to execution of processing tasks on the APD 116. The processor 102 maintains, in system memory 104, one or more control logic modules for execution by the processor 102. The control logic modules include an operating system 120, a kernel mode driver 122, and applications 126. These control logic modules control various features of the operation of the processor 102 and the APD 116. For example, the operating system 120 directly communicates with hardware and provides an interface to the hardware for other software executing on the processor 102. The kernel mode driver 122 controls operation of the APD 116 by, for example, providing an application programming interface ("API") to software (e.g., applications 126) executing on the processor 102 to access various functionality of the APD 116. The kernel mode driver 122 also includes a just-in-time compiler that compiles programs for execution by processing components (such as the SIMD units 138 discussed in further detail below) of the APD 116.

The APD 116 executes commands and programs for selected functions, such as graphics operations and non-graphics operations that may be suited for parallel processing. The APD 116 can be used for executing graphics pipeline operations such as pixel operations, geometric computations, and rendering an image to display device 118 based on commands received from the processor 102. The APD 116 also executes compute processing operations that are not directly related to graphics operations, such as operations related to video, physics simulations, computational fluid dynamics, or other tasks, based on commands received from the processor 102.

The APD 116 includes compute units 132 that include one or more SIMD units 138 that perform operations at the request of the processor 102 in a parallel manner according to a SIMD paradigm. The SIMD paradigm is one in which multiple processing elements share a single program control flow unit and program counter and thus execute the same program but are able to execute that program with different data. In one example, each SIMD unit 138 includes sixteen lanes, where each lane executes the same instruction at the same time as the other lanes in the SIMD unit 138 but can execute that instruction with different data. Lanes can be switched off with predication if not all lanes need to execute a given instruction. Predication can also be used to execute programs with divergent control flow. More specifically, for programs with conditional branches or other instructions where control flow is based on calculations performed by an individual lane, predication of lanes corresponding to control flow paths not currently being executed, and serial execution of different control flow paths allows for arbitrary control flow.

The basic unit of execution in compute units 132 is a work-item. Each work-item represents a single instantiation of a program that is to be executed in parallel in a particular lane. Work-items can be executed simultaneously as a "wavefront" on a single SIMD processing unit 138. One or more wavefronts are included in a "work group," which includes a collection of work-items designated to execute the same program. A work group can be executed by executing each of the wavefronts that make up the work group. In alternatives, the wavefronts are executed sequentially on a single SIMD unit 138 or partially or fully in parallel on different SIMD units 138. Wavefronts can be thought of as the largest collection of work-items that can be executed simultaneously on a single SIMD unit 138. Thus, if commands received from the processor 102 indicate that a particular program is to be parallelized to such a degree that the program cannot execute on a single SIMD unit 138 simultaneously, then that program is broken up into wavefronts which are parallelized on two or more SIMD units 138 or serialized on the same SIMD unit 138 (or both parallelized and serialized as needed). A scheduler 136 performs operations related to scheduling various wavefronts on different compute units 132 and SIMD units 138.

The parallelism afforded by the compute units 132 is suitable for graphics related operations such as pixel value calculations, vertex transformations, and other graphics operations. Thus, in some instances, a graphics pipeline 134, which accepts graphics processing commands from the processor 102, provides computation tasks to the compute units 132 for execution in parallel.

The compute units 132 are also used to perform computation tasks not related to graphics or not performed as part of the "normal" operation of a graphics pipeline 134 (e.g., custom operations performed to supplement processing performed for operation of the graphics pipeline 134). An application 126 or other software executing on the processor 102 transmits programs that define such computation tasks to the APD 116 for execution.

Figure 3:
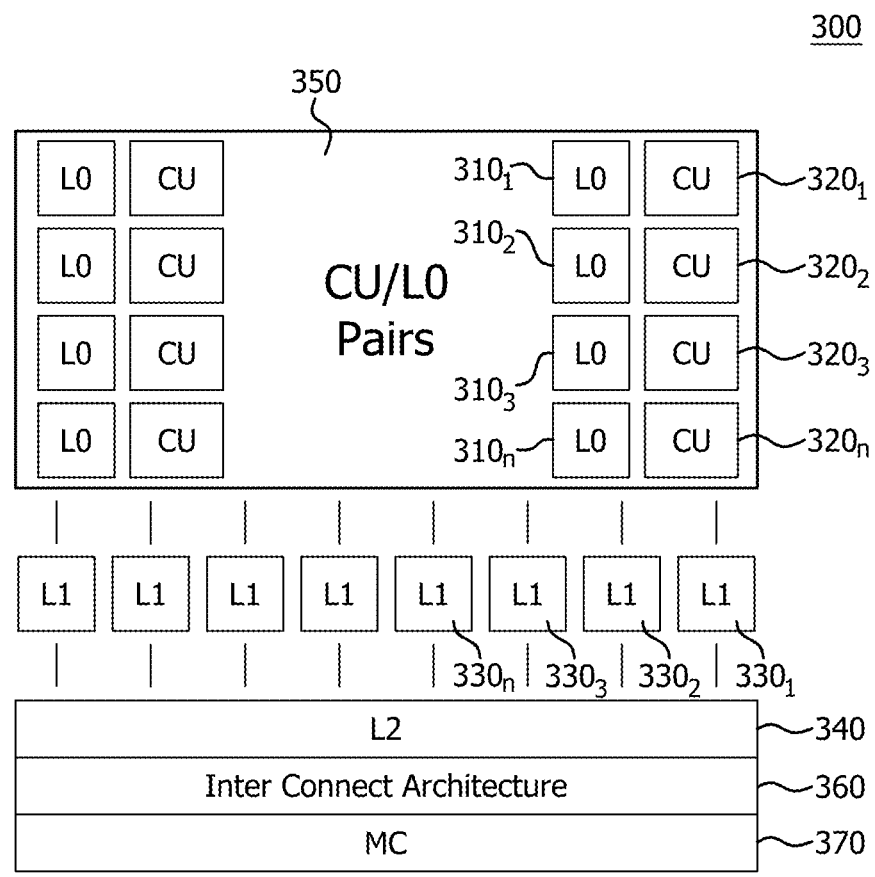
FIG. 3 illustrates a current cache system where the L0 caches are standalone.

FIG. 3 illustrates a current cache system 300 where the L0 caches 310 are standalone. The L0 caches include L0 cache $310_1$, L0 cache $310_2$, L0 cache $310_3$, . . . , L0 cache $310_n$, collectively referred to as L0 caches 310. The cache system 300 on a graphics processing unit (GPU) consists of several levels around the compute unit (CU) 320, L0 cache 310, L1 cache 330, and L2 cache 340. The CUs include CU $320_1$, CU $320_2$, CU $320_3$, . . . , CU $320_n$, collectively referred to as CUs 320. The L1 caches include L1 cache $330_1$, L1 cache $330_2$, L1 cache $330_3$, . . . , L1 cache $330_n$, collectively referred to as L1 caches 330.

The CUs 320 and L0 caches 310 may be configured on an array 350. Array 350 may include 80 CU 320/L0 cache 310 pairs. The L0 caches 310 are directly connected to the next portion of the hierarchy in a mesh of tree (MoT) configuration. As would be understood, in system 300, the more levels, the longer latency involved. Since the L0 caches 310 are not connected together, these L0 caches 310 cannot share data.

With reference to FIGS. 1 and 2, CU 320 may be a stream multiprocessor or a SIMD engine. Each compute unit has several processing elements (ALU/stream processor).

L1 (Level 1) cache 330 generally is the fastest memory that is present in a computer system. In terms of priority of access, the L1 cache 330 has the data the processor is most likely to need while completing a certain task. The L1 cache 330 is the top most cache in the hierarchy of cache levels of a processor and is generally the fastest cache in the cache hierarchy. Often the L1 cache 330 is a smaller size and a smaller delay (zero wait-state) because it is usually built into the chip. By way of example only, Static Random-Access Memory (SRAM) may be used for the implementation of the L1 cache 330.

L2 (Level 2) cache 340 is the cache that is next to L1 cache 330 in the cache hierarchy. The L2 cache 340 is usually accessed only if the requested data is not found in the L1 cache 330. The L2 cache 340 is usually used to bridge the gap between the performance of the processor and the memory. By way of example only, Dynamic Random-Access Memory (DRAM) may be used for the implementation of the L2 cache 340. Often, L2 cache 340 is soldered on to the motherboard very close to the chip (but may not be on the chip itself).

Interconnection architecture 360 refers to the underlying system of communication paths that route the signals around on the major components of the chip. The interconnect architecture consists of the topology and organization, physical floorplan, arbitration blocks, protocol, routing algorithms, clocking, and power. All data from and to the cores and to the other peripherals (e.g., memory controller and I/O hub) are routed through interconnection architecture 360. Interconnection architecture 360 provides connection from array 350, L1 cache 330, L2 cache 340 and memory controller 370.

Memory controller (MC) 370 may be a digital circuit that manages the flow of data going to and from the main memory. MC 370 may be a separate chip or integrated into another chip, such as being placed on the same die or as an integral part of a microprocessor. MC 370 may be referred to as a memory chip controller (MCC) or a memory controller unit (MCU).

To get the maximum performance, the required data is expected to be ready in L0 310 which is nearest to CU 320. If there is a cache miss, the latency is usually very long due to the complex routing and arbitration network via interconnection architecture 360, for example, connecting to the other cache levels.

As understood from FIG. 3, and in an exemplary embodiment, the current cache hierarchy is one L0 cache 310 per CU 320, ten L0 caches 310 per L1 cache 330, eight L1 caches 310 per L2 cache 340, in an eighty CU 320 configuration. The connections between caches may be complex, and the data fetch from L0 cache 310 to L2 cache 340 causes 2434 graphics (GFX) clock cycles average per cache miss for a typical RT application. The application has a stressful workload which occupies the whole request/return FIFO registers making the steady state latency high. Ten L0 caches 310 and other memory consumers like SQC/RMI are connected to a single L1 cache 330. L1 cache 330 has a small size with a low hit rate. When there are cache misses, L1 cache 330 is busy with routing and arbitrating to service those connected clients via interconnection architecture 360.

Figure 4:
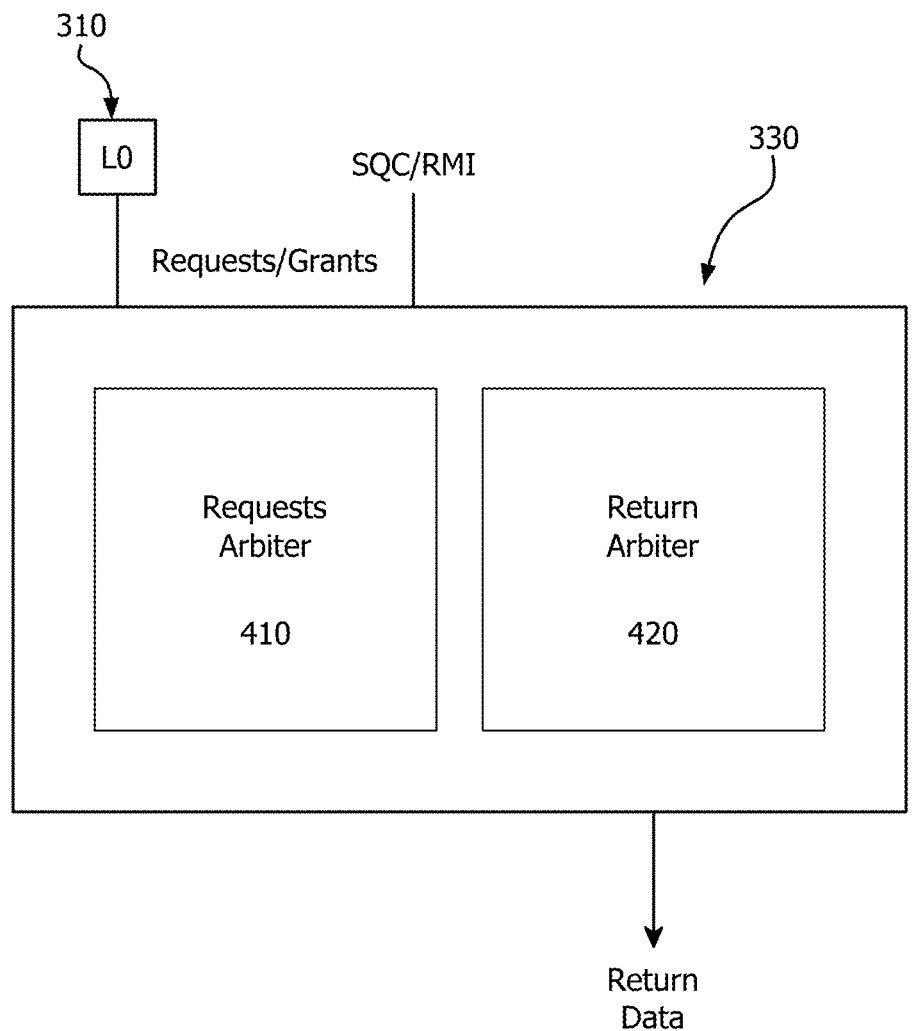
FIG. 4 illustrates a L1 cache block.

FIG. 4 illustrates a L1 cache 330 block. L1 cache 330 block has many different client request/return connections. For simplicity, the L1 cache 330 block of FIG. 4 is illustrated as being connected to a L0 cache 310 and SQC/RMI. The client requests, such as those from L0 cache 310, are provided within the L1 cache 330 block to the request arbiter 410. If the client returns the data is found, a grant is enabled and the return data is sent from the return arbiter 420 back to the client, such as L0 cache 310, for example.

Understanding that FIG. 4 is illustrated using a single L0 cache 310 and L1 cache 330 block, there may be ten L0 caches 310 and other memory consumers like SQC/RMI connected to a single L1 330. L1 cache 330 has a small size with a low hit rate. As set forth above, when there is cache miss, L1 cache 330 may be busy with routing and arbitrating to service those connected clients via request arbiter 410 and return arbiter 420 as well as via interconnection architecture 360. FIG. 4 is provided to evidence a typical MoT solution where the more levels causes the longer the latency.

FIG. 5A illustrates an exemplary cache configuration 500. Cache configuration 500 includes a configuration where the L1 cache-L0 cache connections (illustrated in FIG. 3) are removed. Cache configuration 500 merges the L1 cache and L0 cache to the L0 cache 510. In the exemplary configuration 500, each of the L0 caches 510 are connected by three CUs 520. In the exemplary configuration 500, every CU 520 connects six L0 caches 510 to form a network. This network is similar conceptually to a cellular network and the location of towers with mobile devices interconnected thereto. The border L0 caches of the cache configuration 500 (also referred to as a cellular network) may be connected to interconnection architecture 360 and the L2 cache 340.

FIG. 5B illustrates an expanded view of a portion of the exemplary cache configuration 500. This expanded view is centered about a CU. Specifically, CU $520_1$ is shown in the center of the view. Additional CUs $520_2$, $520_3$, $520_4$, $520_5$ are also shown in part around the four corners of the view. Surrounding CU $520_1$ are L0 caches $510_0$, $510_1$, $510_2$, $510_3$, $510_4$, $510_5$. These L0 caches $510_0$, $510_1$, $510_2$, $510_3$, $510_4$, $510_5$ can be named for identification at least for the present description. In one embodiment, the surrounding L0 caches $510_0$, $510_1$, $510_2$, $510_3$, $510_4$, $510_5$ of the CU $520_1$ are named as 0, 1, 2, 3, 4, 5 counter-clockwise. Using such a naming convention provides L0 cache $510_0$ with the name 0, L0 cache $510_1$ with the name 1, L0 cache $510_2$ with the name 2, L0 cache $510_3$ with the name 3, L0 cache $510_4$ with the name 4, and L0 cache $510_5$ with the name 5. As would be appreciated by a person having ordinary skill in the art, other suitable naming conventions may also be used. Surrounding L0 caches include those L0 caches that are adjacent to CU $520_1$ allowing CU $520_1$ to have direct communication with those L0 caches, rather than through a set of intermediate L0 caches as will be described for subsequent tiers of L0 caches. In a configuration, surrounding L0 caches may include those caches that are communicatively adjacent to CU $520_1$, those caches that are positionally adjacent to CU $520_1$, or both.

FIG. 5C illustrates another expanded view of a portion of cache configuration 500. This expanded view is centered about a L0 cache. Specifically, L0 cache 510 is shown in the center of the view. Additional L0 caches are also shown around the periphery of the view. The six elements adjacent to L0 cache 510 at the center include three other L0 caches $510_0$, $510_1$, $510_2$ and three CUs $520_0$, $520_1$, $520_2$ arranged in an alternating pattern as shown. This alternating pattern provides L0 cache $510_0$, CU $520_0$, L0 cache $510_1$, CU $520_1$, L0 cache $510_2$, CU $520_2$ as L0 cache 510 as adjacent to L0 cache 510 while rotating around L0 cache 510 in a counter clockwise direction. These L0 caches $510_0$, $510_1$, $510_2$ and CUs $520_0$, $520_1$, $520_2$ can be named for identification at least for the present description. In one embodiment, the surrounding L0 caches $510_0$, $510_1$, $510_2$ and CUs $520_0$, $520_1$, $520_2$ are named as 0, 0, 1, 1, 2, 2 in a counter-clockwise fashion. Using such a naming convention provides L0 cache $510_0$ with the name 0, L0 cache $510_1$ with the name 1, L0 cache $510_2$ with the name 2, CU $520_0$ with the name 0, CU $520_1$ with the name 1, and CU $520_2$ with the name 2. As would be appreciated by a person having ordinary skill in the art, other suitable naming conventions may also be used.

Operationally, in exemplary configuration 500, and depicted specifically in FIG. 5B, CU $520_1$ may receive a data request. CU $520_1$ sends the received data request to the surrounding six L0 caches $510_0$, $510_1$, $510_2$, $510_3$, $510_4$, $510_5$ simultaneously. If any of the L0 caches $510_0$, $510_1$, $510_2$, $510_3$, $510_4$, $510_5$ returns a hit for the data request, then L0 cache sends the hit confirmation back to CU $520_1$. Once the hit confirmation is received by CU $520_1$, CU $520_1$ acknowledges the hit to the surrounding six L0 caches $510_0$, $510_1$, $510_2$, $510_3$, $510_4$, $510_5$ to kill the data request.

For completeness of understanding the description, and as will be described in further detail with respect to FIG. 6, in an embodiment, when a miss occurs the data request is propagated as follows. If any L0 caches $510_0$, $510_1$, $510_2$, $510_3$, $510_4$, $510_5$ returns a miss, then L0 cache returning a miss attempts to access its adjacent L0 caches (not specifically shown in FIG. 5B) for the cached data. For example, if the missed data request originated from CU $520_1$, the L0 cache returning the miss (L0 cache $510_0$, $510_1$, $510_2$, $510_3$, $510_4$, $510_5$) propagates the data request to the L0 cache in the opposite direction, i.e., the L0 ID=(CU ID+1)mod 3. Further, if the miss request originated from an L0 cache 510 in FIG. 5C, for example, the L0 returning the miss (L0 cache $510_0$, $510_1$, $510_2$) propagates the data request to the other two L0 caches to which it is connected that are not adjacent to L0 cache 510. In an embodiment, if the L0 cache returning the miss (L0 cache $510_0$, $510_1$, $510_2$) receives an acknowledgement from the originating CU 520 that a hit has been achieved, the L0 cache returning the miss (L0 cache $510_0$, $510_1$, $510_2$) kills the miss request by passing the acknowledgement to the L0 caches where the miss request was sent.

In effect in this embodiment, the miss request forms a shock wave originating from CU $520_1$, the radius of which is equal to the searching steps of only one direction of the propagation of the L0 caches. If no L0 cache contains the missed data, eventually the searching requests reach the border cells, and the total search latency is equal to the longest radius multiplied by the latency of a single L0 cache. A single CU $520_1$ includes six adjacent L0 caches $510_0$, $510_1$, $510_2$, $510_3$, $510_4$, $510_5$ so the routing and arbitration tree is small and the latency is only one cycle for a request/acknowledgement from the origination CU $520_1$. By way of example, for an eighty CU configuration, the network of L0 caches has a radius of 9 steps. The maximum searching path is the diameter of the network which is equal to 2*radius, so 18 for the entire network. Such a configuration provides a total searching latency per request of less than 18 cycles, which is approximately 100 times faster than the current cache network of FIG. 3. Since all of the L0 caches are connected, the data may be shared globally providing additional benefits to applications which need to share data extensively, such as machine learning, ray tracing, and the like.

Figure 6:
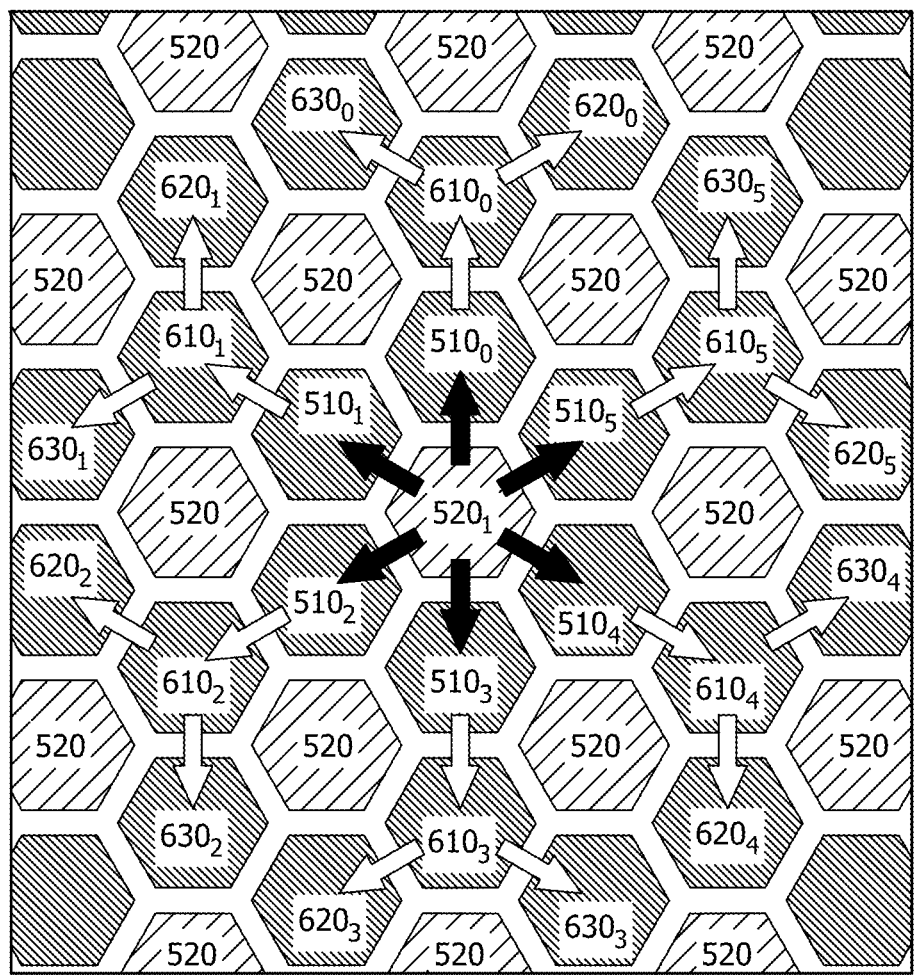
FIG. 6 illustrates a view of the cache configuration of FIG. 5A depicted between the viewing levels of FIG. 5A and FIG. 5B to exemplify the propagation of data requests.
Figure 6:
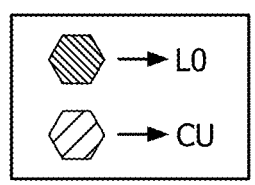

FIG. 6 illustrates a view of cache configuration 500 depicted between the viewing levels of FIG. 5A and FIG. 5B to exemplify the propagation of data requests. While generally described above with respect to FIG. 5, FIG. 6 provides a more concrete illustration of the propagation of data requests within the present system. In FIG. 6, CU $520_1$ sends a data request to the six L0 caches connected thereto simultaneously. This includes L0 cache $510_0$, L0 cache $510_1$, L0 cache $510_2$, L0 cache $510_3$, L0 cache $510_4$, L0 cache $510_5$. As discussed above with respect to FIG. 5B, in an embodiment, if any of the L0 caches $510_0$, $510_1$, $510_2$, $510_3$, $510_4$, $510_5$ returns a hit for the data request, then L0 cache sends the hit confirmation back to CU $520_1$. Once the hit confirmation is received by CU $520_1$, CU $520_1$ acknowledges the hit to the surrounding six L0 caches $510_0$, $510_1$, $510_2$, $510_3$, $510_4$, $510_5$. In essence, this interaction with the surrounding six L0 caches $510_0$, $510_1$, $510_2$, $510_3$, $510_4$, $510_5$ forms a first tier of data requests from CU $520_1$.

If any of the first tier L0 caches $510_0$, $510_1$, $510_2$, $510_3$, $510_4$, $510_5$ returns a miss, the L0 cache returning the miss (L0 cache $510_0$, $510_1$, $510_2$, $510_3$, $510_4$, $510_5$) propagates the data request to the other adjacent L0 cache 610 to which it is connected. In the situation where all of the first tier L0 caches $510_0$, $510_1$, $510_2$, $510_3$, $510_4$, $510_5$ returns a miss, all of the first tier L0 caches $510_0$, $510_1$, $510_2$, $510_3$, $510_4$, $510_5$ propagates the data request to the other adjacent L0 cache 610 ($610_0$, $610_1$, $610_2$, $610_3$, $610_4$, $610_5$) to which it is connected.

By way of example, if the missed data request originated from CU $520_1$, the L0 cache returning the miss (L0 cache $510_0$, $510_1$, $510_2$, $510_3$, $510_4$, $510_5$) propagates the data request to the L0 cache in the opposite direction, i.e., the L0 ID=(CU ID+1)mod 3. For L0 cache $510_0$, the data request may be propagated to L0 cache $610_0$. For L0 cache $510_1$, the data request may be propagated to L0 cache $610_1$. For L0 cache $510_2$, the data request may be propagated to L0 cache $610_2$. For L0 cache $510_3$, the data request may be propagated to L0 cache $610_3$. For L0 cache $510_4$, the data request may be propagated to L0 cache $610_4$. For L0 cache $510_5$, the data request may be propagated to L0 cache $610_5$. In essence, this interaction with the surrounding L0 caches 610 forms a first tier of data requests from CU $520_1$ and propagates the data request to a second tier of L0 caches 610.

Further, if the miss request originated from an L0 cache 510, the L0 returning the miss (L0 cache $610_0$, $610_1$, $610_2$, $610_3$, $610_4$, $610_5$) propagates the data request to the other two L0 caches 620, 630 to which L0 cache 610 is connected that are not adjacent to L0 cache 510. For L0 cache $610_0$, the data request may be propagated to L0 cache $620_0$ and L0 cache $630_0$. For L0 cache $610_1$, the data request may be propagated to L0 cache $620_1$ and L0 cache $630_1$. For L0 cache $610_2$, the data request may be propagated to L0 cache $620_2$ and L0 cache $630_2$. For L0 cache $610_3$, the data request may be propagated to L0 cache $620_3$ and L0 cache $630_3$. For L0 cache $610_4$, the data request may be propagated to L0 cache $620_4$ and L0 cache $630_4$. For L0 cache $610_5$, the data request may be propagated to L0 cache $620_5$ and L0 cache $630_5$. In essence, this interaction with the surrounding L0 caches 620, 630 forms a third tier of data requests from CU $520_1$ and propagates the data request to a third tier of L0 caches 610.

As would be understood by a person having skill in the art, additional tiers may be included extrapolating the configuration beyond that depicted in FIG. 6.

In an embodiment, if the L0 cache returning the miss (L0 cache $510_0$, $510_1$, $510_2$, $510_3$, $510_4$, $510_5$) receives an acknowledgement from the originating CU $520_1$ that a hit has been achieved, the L0 cache returning the miss (L0 cache $510_0$, $510_1$, $510_2$, $510_3$, $510_4$, $510_5$) kills the miss request by passing the acknowledgement to the L0 caches where the miss request was sent. This passing of the acknowledgement includes any successive tiers of L0 caches that have been included in the data request.

As described herein, the miss requests form a shock wave originating from the center CU $520_1$, the radius is equal to the searching tiers of one direction of propagation of the data requests.

In an instance where none of the L0 caches contain the requested data (i.e., all caches return misses), the data requests reach the border L0 caches, and the total search latency is equal to the number of searched tiers multiplied by a single L0 cache's latency and the data request may then be propagated to the L2 cache.

Figure 7:
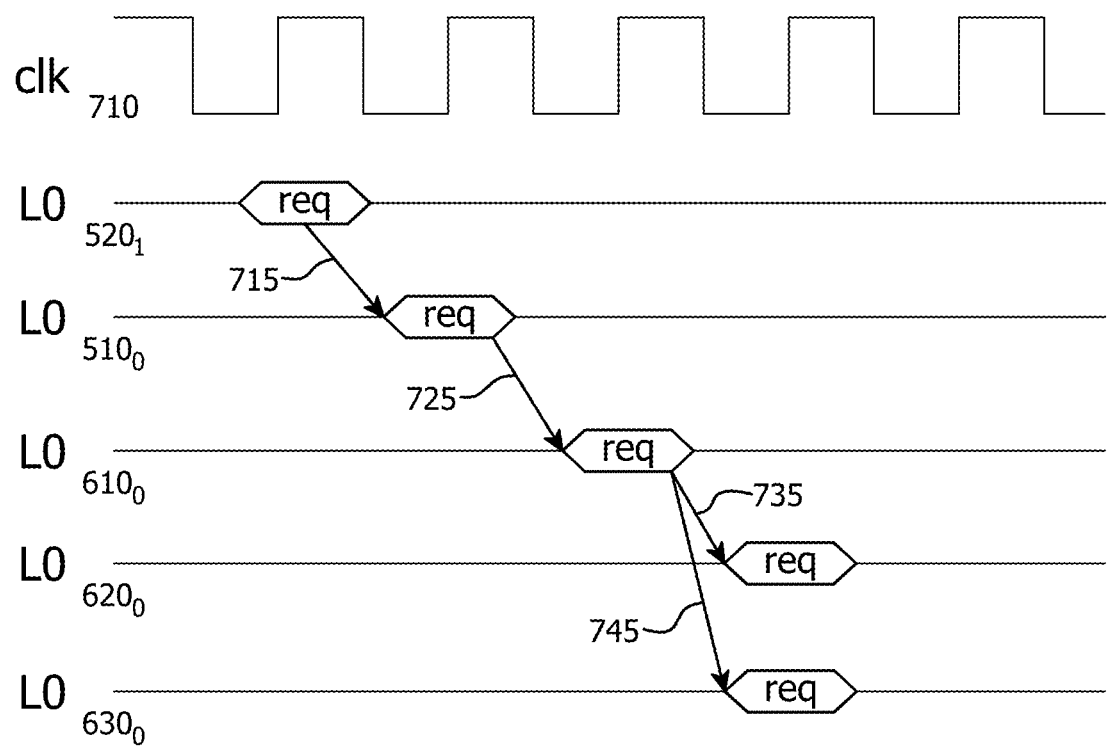
FIG. 7 illustrates a plot of the timing of the propagation of data requests in the tiers of the cache configuration.

FIG. 7 illustrates a plot 700 of the timing of the propagation of data requests in the tiers of exemplary cache configuration 500. By way of example, the propagation of data requests via a single path from CU $520_1$ through L0 cache $510_0$ to L0 cache $610_0$ and finally to L0 cache $620_0$ and L0 cache $630_0$ is shown. The propagation of the data request at step 715 from CU $520_1$ to L0 cache $510_0$ occurs in the first cycle of clock 710. The propagation of the data request at step 725 from L0 cache $510_0$ to L0 cache $610_0$ occurs in the second cycle of clock 710. The propagation of the data request at step 735 from L0 cache $610_0$ to L0 cache $620_0$ and the propagation of the data request at step 745 from L0 cache $610_0$ to L0 cache $630_0$ both occur in the third cycle of clock 710. That is, in three cycles of clock 710, the data request has propagated through three tiers (radius 3) of L0 caches.

As would be understood the timing of propagation of data requests via the other similar paths for other L0 caches $510_1$, $510_2$, $510_3$, $510_4$, $510_5$ of FIG. 6 would be identical (and contemporaneous in clock cycles) to that described with respect to L0 cache $510_0$.

A single CU has six L0 caches causing the routing and arbitration tree to be small. This tree provides a latency of one cycle for a request/acknowledgement from the origination CU. For an 80 CU configuration, the configuration has a radius of 9 providing a maximum searching path for the diameter (2*radius) of 18 for the whole configuration. The total searching latency per request is less than 18 cycles, 100 times faster than the current cache network. Further, since the L0 caches are connected, the data can be shared globally providing benefit to applications which need to share data extensively, such as machine learning, ray tracing, and the like.

Figure 8:
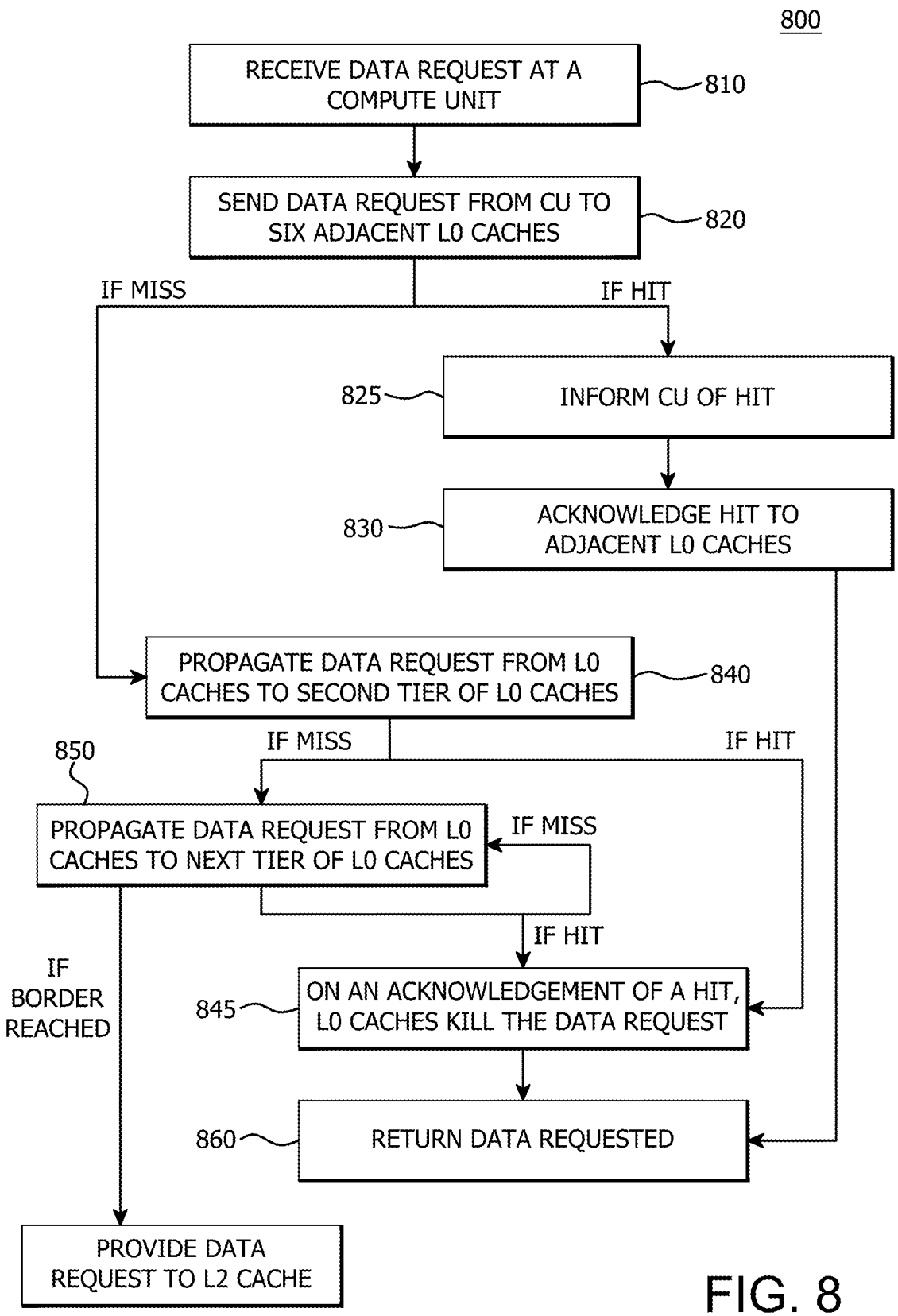
FIG. 8 illustrates a method of propagating data requests in the cache configuration of FIG. 5A.

FIG. 8 illustrates a method 800 of propagating a data request in a cache configuration, such as exemplary cache configuration 500. Method 800, at step 810, includes receiving a data request at a CU. At step 820, method 800 includes sending the data request from the CU to the adjacent L0 caches. In the example configuration, there may be six adjacent L0 caches.

If one of the adjacent L0 caches returns a hit, at step 825 of method 800, the L0 cache with the hit informs the CU. The CU then acknowledges the hit to the adjacent L0 caches at step 830 and returns the requested data at step 860.

If the adjacent L0 caches miss, method 800 continues with the adjacent L0 caches propagating the data request to a second tier of L0 caches at step 840. In the example, the six adjacent L0 caches propagate the data request to the next tier of adjacent L0 caches.

If the second tier of L0 caches miss, method 800 continues from the L0 caches in the current tier (initially the second tier) by propagating the data request to the next lower tier of L0 caches at step 850. If this next lower tier of L0 caches misses, step 850 is performed iteratively in a loop by propagating the data request to the next tier of L0 caches.

If the second or subsequent tier of L0 caches returns a hit, the L0 caches kill the data request at step 845.

Once a hit is achieved in any tier, via step 830 or step 845, method 800 continues by returning the data requested at step 860.

In the event that successive tiers continue to return misses, the searching requests may reach the border cells and the data request may be provided to an L2 cache at step 870, such as by interconnection architecture 360.

It should be understood that many variations are possible based on the disclosure herein. Although features and elements are described above in particular combinations, each feature or element can be used alone without the other features and elements or in various combinations with or without other features and elements.

The various functional units illustrated in the figures and/or described herein (including, but not limited to, the processor 102, the input driver 112, the input devices 108, the output driver 114, the output devices 110, the accelerated processing device 116, the scheduler 136, the graphics processing pipeline 134, the compute units 132, the SIMD units 138, compute units 320, L0 caches 310, L1 caches 330, L2 caches 340, interconnection architecture 360, and memory controller 370 may be implemented as a general purpose computer, a processor, or a processor core, or as a program, software, or firmware, stored in a non-transitory computer readable medium or in another medium, executable by a general purpose computer, a processor, or a processor core. The methods provided can be implemented in a general-purpose computer, a processor, or a processor core. Suitable processors include, by way of example, a general-purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such instructions capable of being stored on a computer readable media). The results of such processing can be maskworks that are then used in a semiconductor manufacturing process to manufacture a processor which implements features of the disclosure.

The methods or flow charts provided herein can be implemented in a computer program, software, or firmware incorporated in a non-transitory computer-readable storage medium for execution by a general-purpose computer or a processor. Examples of non-transitory computer-readable storage mediums include a read only memory (ROM), a random-access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A uniform cache system for fast data access, the system comprising:
   a plurality of compute units (CUs) coupled with a plurality of L0 caches in a geometrical configuration where a first group of the plurality of L0 caches is adjacent to and surrounds one of the plurality of CUs; and
   upon a request for data, the one of the plurality of CUs queries each of the first group of the plurality of L0 caches to satisfy the request.

2. The system of claim 1, on a condition of a hit, one of the first group of the plurality of L0 cache returning the data requested.

3. The system of claim 1 wherein the first group of the plurality of L0 caches comprises six L0 caches.

4. The system of claim 1 wherein the plurality of CUs forms a CU group that with a group of L0 caches surrounds each of the plurality of L0 caches, and the CU group includes three CUs.

5. The system of claim 1, further comprising on a condition that the first group of the plurality of L0 caches fails to satisfy the data request, having at least one of the first group of the plurality of L0 caches query an adjacent second group of the plurality of L0 caches to satisfy the request.

6. The system of claim 5, further comprising on a condition that the second group of the plurality of L0 caches fails to satisfy the data request, having at least one of the second group of the plurality of L0 caches propagating the query to the next group of L0 caches in the plurality of L0 caches.

7. The system of claim 6, further comprising iterating subsequent propagations of the query to subsequent next groups of L0 caches.

8. A method performed in a uniform cache system for fast data access, the method comprising:
   receiving a request for data at one of a plurality of compute units (CUs); and
   querying each of a first group of a plurality of L0 caches to satisfy the received request, the first group of the plurality of L0 caches being configured in a geometrical configuration with the first group of the plurality of L0 caches being adjacent to and surrounding the one of the plurality of CUs.

9. The method of claim 8, on a condition of a hit in the query, further comprising returning the data requested from one of the first group of the plurality of L0 cache.

10. The method of claim 8 wherein the first group of the plurality of L0 caches comprises six L0 caches.

11. The method of claim 8 wherein the plurality of CUs forms a CU group that with a group of L0 caches surrounds each of the plurality of L0 caches, and the CU group includes three CUs.

12. The method of claim 8, further comprising on a condition that the first group of the plurality of L0 caches fails to satisfy the data request, having at least one of the first group of the plurality of L0 caches query an adjacent second group of the plurality of L0 caches to satisfy the request.

13. The method of claim 12, further comprising on a condition that the second group of the plurality of L0 caches fails to satisfy the data request, having at least one of the second group of the plurality of L0 caches propagating the query to the next group of L0 caches in the plurality of L0 caches.

14. The method of claim 13, further comprising iterating subsequent propagations of the query to subsequent next groups of L0 caches.

15. The method of claim 8, on a condition of a miss, providing the data request to an L2 cache.

16. A non-transient computer readable medium including hardware design code stored thereon which when executed by a processor cause the system to perform a method for fast data access in a uniform cache system, the method comprising:

receiving a request for data at one of a plurality of compute units (CUs); and querying each of a first group of a plurality of L0 caches to satisfy the received request, the first group of the plurality of L0 caches being configured in a geometrical configuration with the first group of the plurality of L0 caches being adjacent to and surrounding the one of the plurality of CUs.

17. The computer readable medium of claim 16, further comprising on a condition that the first group of L0 caches fails to satisfy the data request, propagating the data request from the first group of L0 caches to a next tier of L0 caches to satisfy the request.

18. The computer readable medium of claim 17, further comprising iterating subsequent propagations of the data request to subsequent next groups of L0 caches.

19. The computer readable medium of claim 16, further comprising on a condition of a hit, returning the data requested.

20. The computer readable medium of claim 16, further comprising on a condition of a miss, providing the data request to an L2 cache.

* * * * *